March 15, 1932.  L. S. DEITZ, JR  1,849,420
METHOD FOR RECOVERING AMMONIA
Filed May 1, 1929
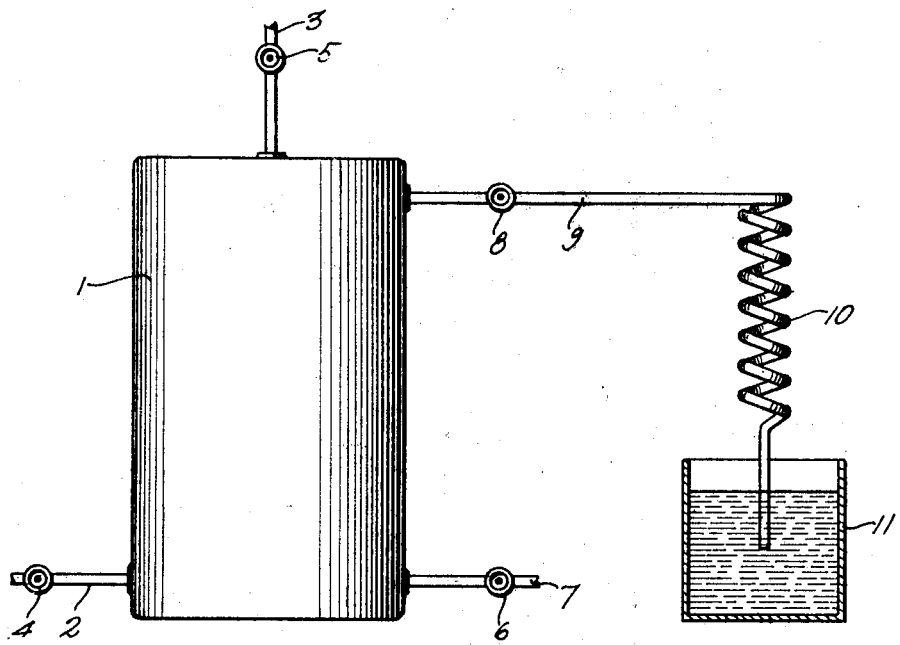
Louis S. Deitz, Jr., INVENTOR,
BY
Byrnes Townsend & Brickenstein, ATTORNEYS.

Patented Mar. 15, 1932

1,849,420

UNITED STATES PATENT OFFICE

LOUIS S. DEITZ, JR., OF RIFLE, COLORADO, ASSIGNOR TO UNITED STATES VANADIUM CORPORATION, A CORPORATION OF DELAWARE

METHOD FOR RECOVERING AMMONIA

Application filed May 1, 1929. Serial No. 359,693.

My invention relates to methods of recovering ammonia from gas mixtures. One of its objects is the recovery of ammonia from such mixtures in a concentrated form for producing anhydrous ammonia, ammonia compounds or derivatives, or for other purposes.

A gas mixture which contains ammonia is brought in contact with solid vanadic acid, $V_2O_5$, in the presence of water. Solid vanadic acid in the presence of water combines with the ammonia present in a dilute or concentrated gas mixture when temperatures between 0° C. and 100° C. are used. At these temperatures the reaction product remains in a solid condition and a composition consisting mainly of ammonium metavanadate is formed according to the following equation:

$$V_2O_5 + 2NH_3 + H_2O = 2NH_4VO_3$$

Upon heating the composition to 100° C. or higher, vanadic acid is regenerated and ammonia and water substantially in the proportions shown in the above equation are liberated. The regenerated material containing vanadic acid may then be used again as an absorbent. The best temperatures for absorbing ammonia are about 30° C. to 80° C. and the best temperatures for regenerating the vanadic acid are about 200° C. to 250° C. Higher temperatures may be used to regenerate the vanadic acid but when vanadic acid is heated to temperatures above 400° C. its ability to absorb ammonia is impaired.

A material which consists entirely of vanadic acid may be used, or a material containing inert substances having melting points above the regenerating temperatures, such as inert oxides or other oxides of vanadium may be used. The vanadic acid or vanadic acid material may be brought into contact with the ammonia-containing gas mixture by passing the gas mixture over or through layers of the vanadic acid material. A large surface area of vanadic acid may be presented to the gas by distributing the acid in layers upon shelves, or upon surfaces or in the pores of inert material such as pebbles or pumice.

An effective absorbing medium consists of a bed of vanadic acid concentrate which contains, for example, about 83% $V_2O_5$, 12% $Na_2O$ and the remainder iron, aluminum, and insoluble material. This concentrate is a fluffy material weighing about 25 pounds per cubic foot. It presents to the gas mixture a large area per unit of weight and makes a porous bed through which the gas may be passed without excessive resistance. Regenerating temperatures up to 400° C. do not materially change the porosity, density and absorbent properties of this material.

The presence of at least one molecule of water for each two molecules of ammonia is necessary to recover all of the ammonia from the gas mixture. A deficiency of water results in a proportionate loss of ammonia, but an excess of water may pass on largely with the gas stream. If the gas mixture contains an insufficient content of water to fix all of the ammonia present, water is added by spraying water or steam into the gas mixture, or in other convenient manner.

The ammonia-bearing gas may contain large or small amounts of other substances, such as nitrogen, oxygen, hydrogen, oxides of carbon, hydrocarbon gases or solids and vapors of other substances which do not combine with ammonia or vanadic acid at the temperatures used in absorbing the ammonia.

The vapor of ammonia and water which is liberated in regenerating vanadic acid, contains ammonia and water in the proportion of one molecule of $H_2O$ to two molecules of $NH_3$.

This vapor may contain as much as 65.4% $NH_3$ and the vapor may be dried to recover anhydrous ammonia; or the ammonia and water vapor may be subjected to condensation, absorption or neutralization.

In the drawing constituting a part thereof, the figure is a diagrammatic view of a suitable device for carrying out my process.

As illustrative of one special manner of practicing my invention, a chamber 1 is provided with a gas inlet pipe 2 and an outlet pipe 3. The pipe 2 is provided with a valve or gate 4 and the pipe 3 is provided with a valve or gate 5. The container 1 is filled with the low density, fluffy vanadic acid material, described above. A current of gas consisting of nitrogen with a few hundredths of a percent of ammonia and water at a temperature of 70° C. is conducted to the container through the pipe 2 and is passed through the bed of vanadic acid. The valve 5 is opened and the nitrogen and unabsorbed material are discharged through the pipe 3.

When a quantity of ammonium metavanadate is formed by the combination of water, ammonia and vanadic acid, the valves 4 and 5 are closed, a valve 6 in the steam pipe 7 and the valve 8 in the cooler pipe 9 are opened. Superheated steam at a temperature of about 200° C. is admitted through the pipe 7. The ammonia and water are liberated from the vanadic acid and conducted away through the pipe 9 to a condenser or cooling coil 10.

The condenser 10 leads into a vessel 11 which contains water, and liquid ammonia solution is formed and retained therein.

The ammonia and water which are absorbed in the vanadic acid may be liberated by applying heat externally to the container in which case a larger percentage of ammonia is contained in the regenerated gas. It is evident that the regeneration of vanadic acid may be effected in a separate chamber and that various heating means may be employed for this purpose. A plurality of containers similar to the one shown in the figure may be connected in series, parallel or series-parallel relationship so as to permit regeneration of vanadic acid in certain containers of the system without interrupting the absorption of ammonia in others.

I claim:

1. The method of recovering ammonia from a gas mixture containing the same which comprises passing said mixture through a bed of vanadic acid at a temperature higher than 0° C. and lower than 100° C., said vanadic acid having a fluffy texture and weighing about 25 pounds per cubic foot, and then heating the material of said bed to temperatures between 100° C. and 400° C.

2. The process of concentrating ammonia which comprises bringing a gas mixture which contains ammonia in contact with vanadic acid in the presence of water, supplying heat so as to establish temperatures between 30° C. and 80° C., thereby fixing ammonia as a solid material, and then heating the ammonia containing material to temperatures between 200° C. and 250° C. whereby vanadic acid is regenerated and a gaseous mixture containing ammonia and water is liberated.

3. The method of recovering ammonia which comprises bringing a gas mixture which contains ammonia in contact with solid vanadic acid in the presence of water at temperatures of 30° C. to 80° C., discontinuing the gas mixture, and passing steam in contact with the solid at temperatures between 200° C. and 250° C.

In testimony whereof, I affix my signature.

LOUIS S. DEITZ, JR.